US008660562B2

(12) United States Patent
Tanaka

(10) Patent No.: US 8,660,562 B2
(45) Date of Patent: Feb. 25, 2014

(54) RADIO COMMUNICATION SYSTEM, COMMUNICATION CONTROL METHOD, AND BASE STATION AND MOBILE TERMINAL

(75) Inventor: Yoshinori Tanaka, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/606,136

(22) Filed: Sep. 7, 2012

(65) Prior Publication Data

US 2012/0329464 A1 Dec. 27, 2012

Related U.S. Application Data

(63) Continuation of application No. PCT/JP2010/054572, filed on Mar. 17, 2010.

(51) Int. Cl.
*H04W 36/00* (2009.01)

(52) U.S. Cl.
USPC ............... 455/438; 455/67.11; 455/67.13; 455/450; 455/226.1

(58) Field of Classification Search
USPC ........ 455/436, 438, 450, 452.1, 452.2, 67.11, 455/67.13, 226.1, 226.2, 226.3
See application file for complete search history.

(56) References Cited

U.S. PATENT DOCUMENTS

| 2010/0075689 A1 | 3/2010 | Uemura et al. | |
| 2010/0081388 A1* | 4/2010 | Han et al. | 455/63.1 |
| 2012/0329460 A1* | 12/2012 | Huang et al. | 455/436 |

FOREIGN PATENT DOCUMENTS

| EP | 2 120 475 | 11/2009 |
| JP | 2007-295318 | 11/2007 |
| JP | 4431630 | 12/2009 |
| JP | 2010-35233 | 2/2010 |
| WO | 2008/093621 | 8/2008 |

OTHER PUBLICATIONS

International Search Report dated Apr. 20, 2010, from corresponding International Application No. PCT/ JP2010/054572.
3GPP TR 25.913 V9.0.0 3rd Generation Partnership Project; Technical Specification Group Radio Access Network; Requirements for Evolved UTRA (E-UTRA) and Evolved UTRAN (E-UTRAN) (Release 9), Dec. 2009.
3GPP TR 36.913 V9.0.0 3rd Generation Partnership Project; Technical Specification Group Radio Access Network; Requirements for further advancements for Evolved Universal Terrestrial Radio Access (E-UTRA); (LTE-Advanced) (Release 9), Dec. 2009.
3GPP TS 36.423 V9.1.0 3rd Generation Partnership Project; Technical Specification Group Radio Access Network; Evolved Universal Terrestrial Radio Access Network (E-UTRAN); X2 application protocol (X2AP) (Release 9), Dec. 2009.
Danish Aziz, et al. "Improvement of LTE Handover Performance through Interference Coordination" Proc. VTC 2009, Spring 2009.

* cited by examiner

*Primary Examiner* — Temica M Beamer
(74) *Attorney, Agent, or Firm* — Katten Muchin Rosenman LLP

(57) ABSTRACT

A radio communication system includes first and second base stations that are capable of communicating with a mobile terminal and are also capable of communicating with each other. The first base station includes a first notification means configured to notify the second base station of first resource information indicating a radio resource which reduces interference from the first base station to communication between the second base station and the mobile terminal. The second base station includes a first allocation means configured to allocate the radio resource indicated by the received first resource information to communication between the second base station and the mobile terminal.

11 Claims, 4 Drawing Sheets

RADIO COMMUNICATION SYSTEM, COMMUNICATION CONTROL METHOD, AND BASE STATION AND MOBILE TERMINAL

CROSS-REFERENCE TO RELATED APPLICATION

This application is a continuation application of International Application PCT/JP2010/054572 filed on Mar. 17, 2010 and designated the U.S., the entire contents of which are incorporated herein by reference.

FIELD

The embodiment discussed herein relates to radio communication systems, base stations and mobile terminals included in the radio communication systems, and communication control methods.

BACKGROUND

When a mobile terminal such as a mobile phone or the like moves from the cell of a base station to the cell of another base station in a cellular radio communication system, the mobile terminal switches its connection from the base station to the other base station through handover in order to maintain the communication.

In such a cellular system, communication performance in a cell is limited by interference within the cell itself, interference from another cell (i.e., inter-cell interference), and the like. Therefore, as a scheme for frequency reuse between cells, for example, a long term evolution (LTE) communication technology that is currently standardized in the third generation partnership project (3GPP) employs a "one-cell reuse scheme" using the same frequency in neighboring cells. According to the one-cell reuse scheme, a frequency bandwidth for each cell increases, and therefore enhancement of throughput is expected. However, inter-cell interference increases, whereby deterioration of throughput is caused, in particular, to a mobile terminal located at an edge of a cell (hereinafter also referred to as "cell edge").

In order to reduce such deterioration of throughput, the LTE communication technology employs an inter-cell interference coordination (ICIC) technique based on a fractional frequency reuse (FFR) scheme that allocates a mobile terminal located at a cell edge a frequency different from those used in neighboring cells, or another scheme.

There have been proposed the aforementioned FFR inter-cell interference coordination technique, a handover procedure in which interference is suppressed based on information received from a cell through inter-base station communication, and the like. Please see the following literatures.

Japanese Laid-open Patent Publication No. 2007-295318
3GPP TR25.913
3GPP TR36.913
3GPP TS36.423
D. Aziz, R. Sigle, "*Improvement of LTE Handover Performance through Interference Coordination*," Proc. VTC2009 spring, 2009.

Handover of a mobile terminal is typically carried out at a location near a cell boundary between a handover source base station and a handover destination base station. Thus, communication between the handover source base station and the mobile terminal is susceptible to interference from the handover destination base station, and communication between the handover destination base station and the mobile terminal is susceptible to interference from the handover source base station. Such interference causes deterioration in reception quality of the communication between a base station and a mobile terminal, so that the handover of a mobile terminal suffers from the technical problem that a control signal for handover is less likely to be properly received. When a control signal is not received properly, handover may not be successfully completed, so that communication of the mobile terminal may be disconnected.

According to the aforementioned FFR scheme, one base station allocates a frequency band for which a low transmission power is set by another base station, for communication with a mobile terminal located near a cell boundary with the cell of the other base station. This leads to a reduction in interference from the other base station that has the strongest inter-cell interference in a location near the cell boundary. However, according to the FFR scheme, a frequency allocated to a mobile terminal located at a cell edge is statically or quasi-statically set within a preset bandwidth. Therefore, a frequency band or other radio resources are not sufficiently ensured depending on the quantity of mobile terminals to be handed over, and therefore, the FFR scheme may not exhibit its advantageous effects sufficiently.

SUMMARY

According to an aspect, a radio communication system includes first and second base stations capable of communicating with a mobile terminal and of communicating with each other. The first base station includes first notification means configured to notify the second base station of first resource information when the mobile terminal is handed over from the first base station to the second base station, the first resource information indicating radio resource associated with interference from the first base station to communication between the second base station and the mobile terminal. The second base station includes first allocation means configured to allocate the radio resource indicated by the first resource information, for communication between the second base station and the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An embodiment will now be described in detail by way of example with reference to the accompanying drawings.

(1) Configuration Example

Figure 1:
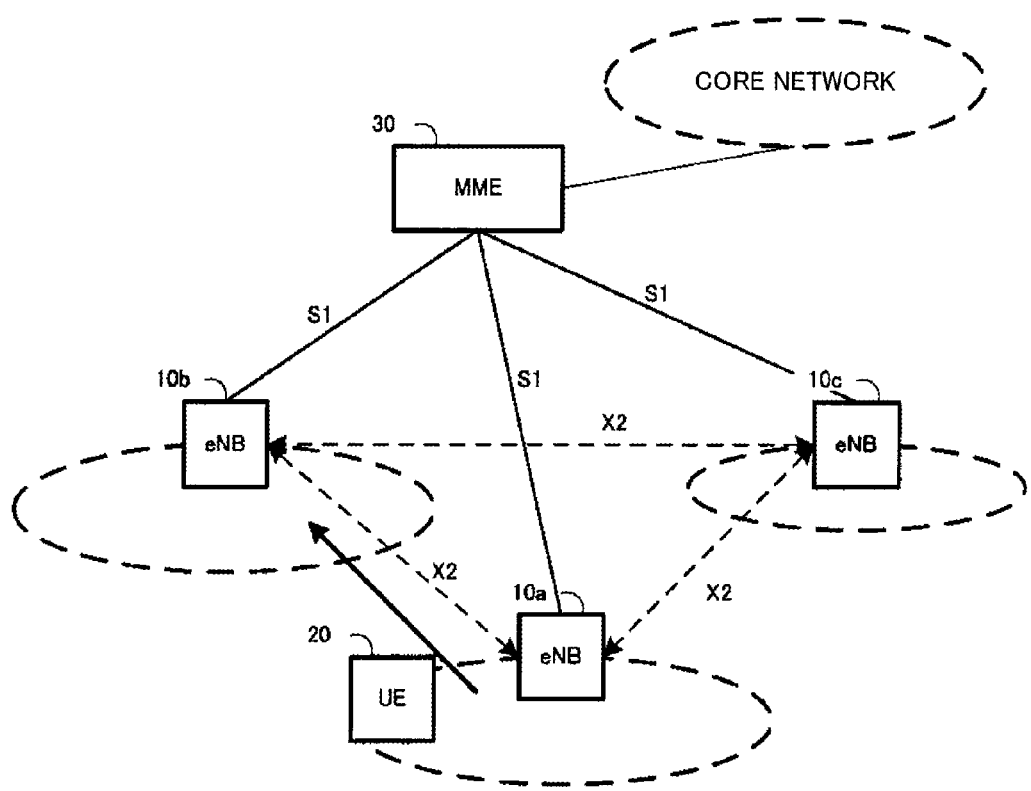
FIG. 1 is a diagram illustrating a configuration example of a radio communication system.

FIG. 1 is a diagram illustrating a configuration of a radio communication system 1 according to one embodiment of the disclosed radio communication system. The radio communication system 1 is, for example, compliant with the LTE (Long Term Evolution) standard, and includes a plurality of base stations (hereinafter, referred to as eNB (evolved Node B)) 10a, 10b, and 10c. The plurality of base stations is connected to a mobility management entity (MME) 30. Each of the eNBs 10a, 10b, and 10c is connected with the MME 30 via an S1 interface. Furthermore, the eNBs 10a, 10b, and 10c, are interconnected with one another via an X2 interface, and perform transmission and reception of appropriate information with one another.

In the radio communication system 1, a mobile terminal (hereinafter referred to as UE (user equipment)) 20 located in the cell of one of the eNBs 10 performs data transmission and reception with the eNB 10.

In the following, description will be given on configurations of the eNBs 10a, 10b, and 10c, with reference to FIG. 2. The eNBs 10a, 10b, and 10c may have substantially the same configuration. Hereinafter, the eNBs are collectively referred to as "eNB 10" where appropriate.

Here, the eNB 10 is one example of a "base station" which forms a cell by transmitting control signals and which establishes communication with a UE 20 located within the cell.

Figure 2:
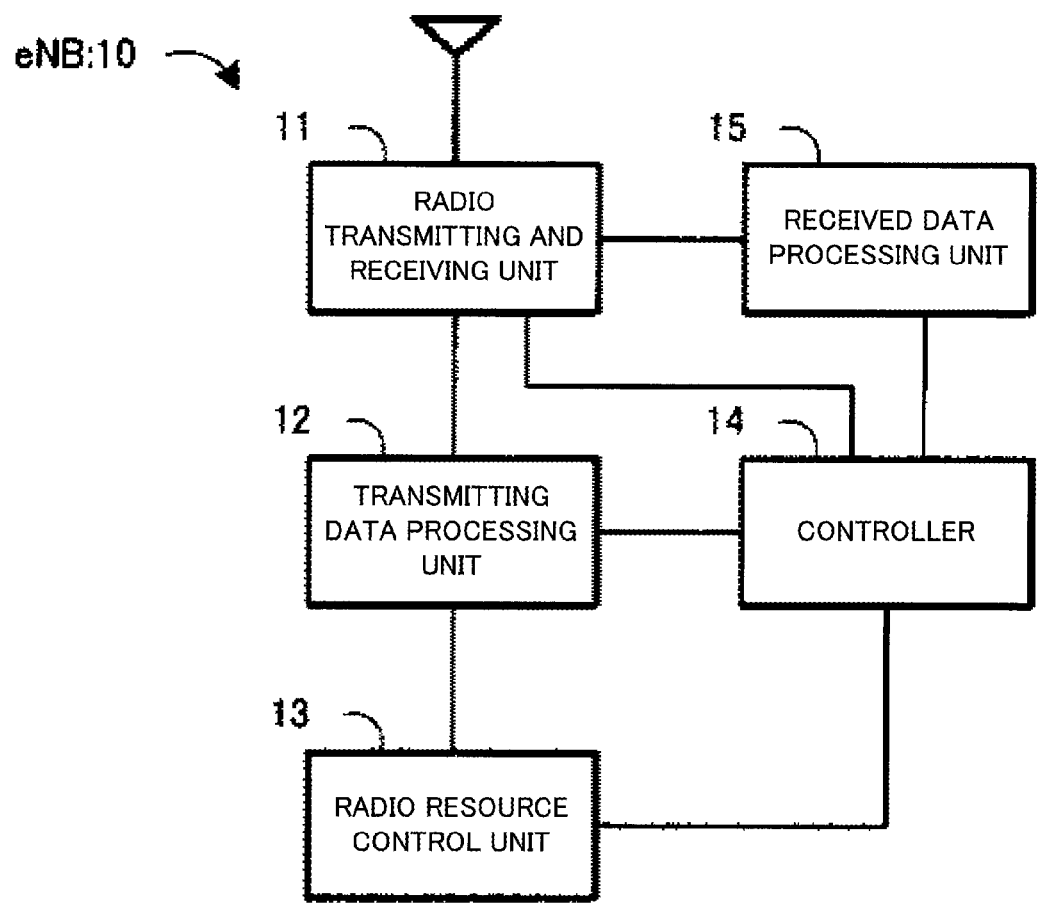
FIG. 2 is a block diagram illustrating a configuration of a base station.

As illustrated in FIG. 2, the eNB 10 includes a radio transmitting and receiving unit 11, a transmitting data processing unit 12, a radio resource control unit 13, a controller 14, and a received data processing unit 15.

The radio transmitting and receiving unit 11 is connected to a radio network via an antenna. Furthermore, the radio transmitting and receiving unit 11 is configured to transmit a signal containing transmitting data that is supplied from the transmitting data processing unit 12, and is configured to supply a signal containing received data from the radio network to the received data processing unit 15.

The transmitting data processing unit 12 encodes and modulates transmitting data that is supplied by operations of the controller 14 and the like. Then, the transmitting data processing unit 12 multiplexes the resultant data with a pilot signal or other broadcast information, and supplies the data to the radio transmitting and receiving unit 11. Specifically, in the eNB 10 according to the present embodiment, the transmitting data processing unit 12 generates transmitting data by multiplexing radio resource information associated with interference with a control signal used for handover, as described later. The "radio resource information associated with interference" is information that is associated with interference which is caused by radio waves transmitted from an eNB 10 and which affects communication between another eNB 10 and the UE 20, and is used to indicate a radio resource which increases or decreases such interference. Specifically, the radio resource information associated with interference with communication between the eNB 10b and the UE 20, transmitted from the eNB 10a, may be information that indicates a radio resource which decreases interference from the eNB 10a when the radio resource is used for communication between the eNB 10b and the UE 20.

The radio resource control unit 13 allocates a radio resource for communication to the UE 20 located in the cell of the eNB 10, in particular, when handover or cooperative communication is performed. Furthermore, as described later, especially when a handover process is performed, the radio resource control unit 13 allocates a radio resource for communication with the UE 20 on the basis of the radio resource information associated with interference received from another eNB 10, as described later. Therefore, the radio resource control unit 13 may be configured to be capable of exchanging a control signal with another eNB 10 via an interface (not illustrated).

The controller 14 generates a control signal for controlling operations of the units in the eNB 10, and also generates a signal to be transmitted via both the transmitting data processing unit 12 and the radio transmitting and receiving unit 11. Furthermore, the controller 14 determines a transmission power for a signal that contains transmitting data to be transmitted by the radio transmitting and receiving unit 11. In particular, in the eNB 10 according to the present embodiment, the controller 14 determines a frequency band to be shared with adjacent eNBs 10, defines, as a reduced power band (RPB) a part of the determined frequency band, especially to be allocated for a UE 20 located at a cell edge of the eNB 10, and sets a relative low transmission power for the RPB.

Here, the "RPB" is a concept employed in the FFR ICIC technology, for example, and represents a frequency band for which an output level of a transmission power is previously set low in order to decrease interference from one eNB within the network to a communication area (in other words, a cell) of another eNB. Each eNB employing the FFR scheme divides an available frequency band into several frequency sub-bands, defines at least one of the frequency sub-bands as an RPB, and sets relatively low a transmission power for the RPB compared with the other frequency sub-bands.

When one eNB 10 allocates a frequency sub-band defined as an RPB of another neighboring eNB 10 to communication with a UE 20 located near a cell boundary with the other eNB 10, a transmission radio wave from the other eNB 10, which causes interference, is low, so that the effect of the interference is suppressed.

The controller 14 does not necessarily statically or quasi-statically define a preset frequency band as an RPB as in the FFR scheme, and the controller 14 may dynamically define a frequency band as an RPB through negotiation with yet another neighboring eNB 10.

Furthermore, the controller 14 determines whether or not handover of the UE 20 to another eNB 10 is needed, based on a transmission power of a signal transmitted from the eNB 10, which is notified of by the UE 20. When it is determined that handover is needed, the controller 14 generates a control signal to be transmitted to and received from the handover destination eNB 10.

The received data processing unit 15 demodulates and decodes a signal containing received data received from the radio transmitting and receiving unit 11, thereby obtaining the received data from the signal. Furthermore, in particular, in the eNB 10 according to the present embodiment, when radio resource information associated with interference that is transmitted from another eNB 10 is contained in the obtained received data, the received data processing unit 15 supplies the radio resource information to the radio resource control unit 13.

Next, description will be given on a configuration of the UE 20 with reference to FIG. 3. The UE 20 is one specific example of a "mobile terminal" in the present embodiment. The UE 20 is located within the cell of the eNB 10 and performs communication with the eNB 10.

Figure 3:
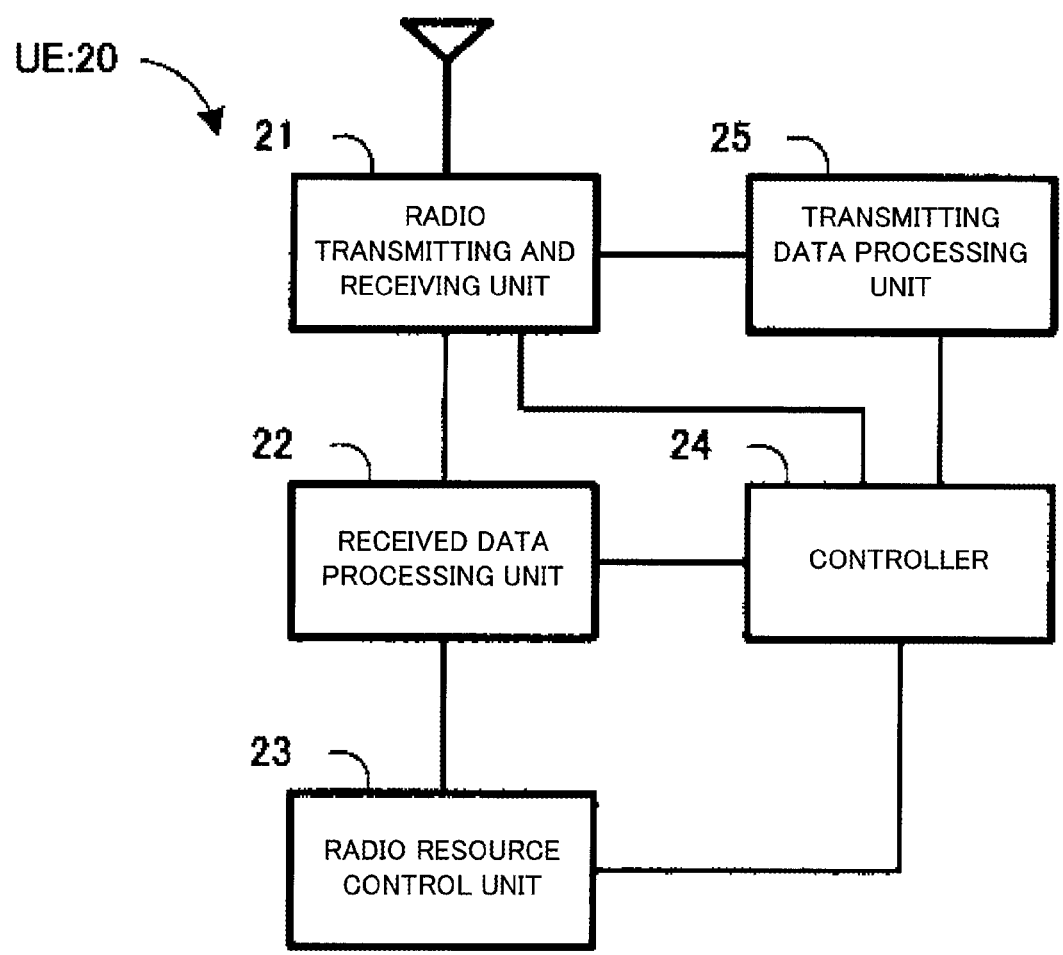
FIG. 3 is a block diagram illustrating a configuration of a mobile terminal.

As illustrated in FIG. 3, the UE 20 includes a radio transmitting and receiving unit 21, a received data processing unit 22, a radio resource control unit 23, a controller 24, and a transmitting data processing unit 25.

The radio transmitting and receiving unit 21 is connected to a radio communication network via an antenna, and transmits and receives a radio signal to and from a currently connected eNB 10. At this time, the radio transmitting and receiving unit 21 transmits a signal containing transmitting data that is supplied from the transmitting data processing unit 25, and supplies a signal containing received data that is received from the radio network to the received data processing unit 22.

The received data processing unit 22 demodulates and decodes the signal containing the received signal from the radio transmitting and receiving unit 21, thereby obtaining the received data. Furthermore, the received data processing unit 22 measures the transmission power of a signal transmitted from the eNB 10, and supplies control information indicating the measurement result to the controller 24.

The radio resource control unit 23 exercises control so as to perform communication using a radio resource that is allocated by the eNB 10, based on a signal containing received data that is processed by the received data processing unit 22.

The controller 24 generates a control signal for controlling operations of the units of the UE 20, and also generates a signal to be transmitted via the transmitting data processing unit 22 and the radio transmitting and receiving unit 21. For example, the controller 24 supplies specific control information identifying the UE 20 to the transmitting data processing unit 25 to include the specific control information into transmitting data. Furthermore, the controller 24 includes information indicating a transmission power of a signal transmitted from the eNB 10 that is supplied by the received data processing unit 22 in the specific control information, and supplies the obtained information to the transmitting data processing unit 25.

The transmitting data processing unit 25 first encodes and modulates the transmitting data that is supplied by operations by the controller 24 and the like, then, multiplexes the resultant data with a pilot signal or other broadcast information, and supplies the obtained data to the radio transmitting and receiving unit 21.

(2) Exemplified Operation

Figure 4:
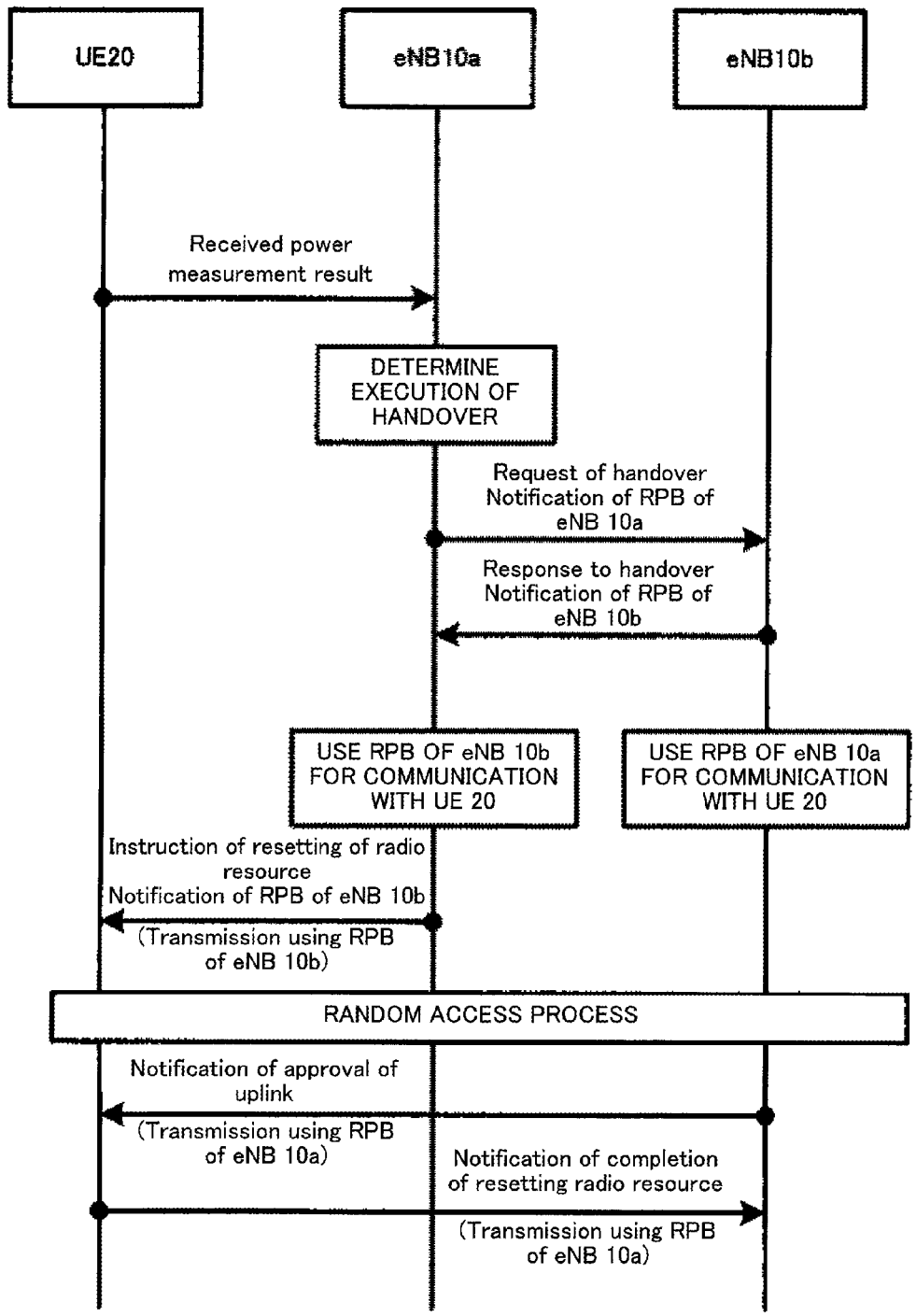
FIG. 4 is a sequence diagram illustrating a handover procedure that is performed in the radio communication system.

A series of processing steps for performing handover of a UE 20 in the radio communication system 1 will be described with reference to the sequence diagram illustrated in FIG. 4. The sequence diagram in FIG. 4 discloses processing steps for performing handover of the UE 20 from the cell of the eNB 10*a* to the cell of the eNB 10*b*, as illustrated in FIG. 1.

The UE 20 in communication with the eNB 10*a* regularly measures a received power such as reference signal received power (RSPP) of signals respectively received from the eNB 10*a* and the eNB 10*b*, and transmits the measurement results to the eNB 10*a*.

When the received power of the signal transmitted from the eNB 10, which is indicated by the measurement information received from the UE 20, falls below a threshold value, while the received power of the signal transmitted from the other eNB 10*b* is sufficiently high, it is decided to perform handover from the eNB 10*a* to the eNB 10*b*.

At this time, the eNB 10*a* multiplexes a control signal for requesting handover with downlink radio resource information associated with interference from the eNB 10*a* to the communication between the eNB 10*b* and the UE 20, and transmits the resultant to the handover-destination eNB 10*b*. In this exemplified operation, information indicating a frequency band of an RPB that is set by the eNB 10*a* (hereinafter referred to as "RPB of the eNB 10*a*") is used as such radio resource information.

If the eNB 10*b* that has received the handover request approves the handover, the eNB 10*b* multiplexes a control signal indicating approval of the handover with downlink radio resource information associated with interference from the eNB 10*b* to the communication between the eNB 10*b* and the UE 20, and transmits the resultant to the eNB 10*a*. As the aforementioned radio resource information, this exemplified operation uses information indicating a frequency band of an RPB that is set by the eNB 10*b* (hereinafter referred to as "RPB of the eNB 10*b*").

The eNB 10*a* that has received the handover approval response sets the RPB of the eNB 10*b* to be multiplexed with the response signal as a frequency band to be used for communication with the UE 20 in a subsequent handover process. Meanwhile, the eNB 10*b* sets the RPB of the eNB 10*a* to be multiplexed with the handover request signal as a frequency band to be used for communication with the UE 20 in the subsequent handover process.

Then, the eNB 10*a* notifies the UE 20 of a message instructing to reset a radio resource for handover. Specifically, this notification is made using a message element such as "RRC Reconfiguration" or the like. At this time, the eNB 10*a* multiplexes a signal for this notification with the RPB of the eNB 10*b*, and transmits the multiplexed signal to the UE 20 using the RPB of the eNB 10*b*, which is set as described above.

The UE 20 that has received the signal performs a random access process to the handover-destination eNB 10*b*, receives an approval for uplink synchronization using the RPB of the eNB 10*a*, and establishes both uplink and downlink synchronizations with the eNB 10*b*.

Furthermore, the UE 20 obtains radio resource information for making a notification of completion of resetting of the radio resource. Specifically, the UE 20 obtains the RPB of the eNB 10*a* from the eNB 10*a* as radio resource information to be used for making the notification to the eNB 10*b*.

Then, the UE 20 notifies the eNB 10*b* of completion of resetting of the radio resource. Specifically, for example, a message element such as "RRC Reconfiguration Complete" may be used for the notification. This notification is made using the RPB of the eNB 10*a*, which is set as described above. The UE 20 performs the handover process from the eNB 10*a* to the eNB 10*b* according to the procedure described above.

(3) Description of Advantageous Effects

It is also contemplated in the conventional FFR scheme to reset an RPB depending on a mobile terminal to be handed over. The FFR scheme, however, needs to adjust operation frequency bands among all neighboring base stations. Thus, much time is needed to determine an RPB. Therefore, there may be a case that communication is disconnected because processing is too late for handover that is an unexpected event for a communication system.

Thus, according to the operations of the radio communication system 1 described above, when it is determined that handover from the eNB 10*a* to the eNB 10*b* is needed, the eNB 10*a* multiplexes a control signal to be transmitted to the eNB 10*b* for requesting handover with the RPB of the eNB 10*a*, so as to make a notification of the RPB of the eNB 10*a*. On the other hand, the eNB 10*b* multiplexes a response signal to be transmitted to the eNB 10*a* for indicating approval of handover, with the RPB of the eNB 10*b*, so as to make a notification of the RPB of the eNB 10*b*. Thus, the eNB 10*a* is able to allocate the RPB of the eNB 10*b* to transmit, to the UE 20, a signal for instructing resetting of the radio resource and instructing the UE 20 to perform handover, which appropriately suppresses interference from the handover-destination eNB 10*b*. When the UE 20 is handed over from the eNB 10*a* to the eNB 10b, the UE 20 is probably located near the cell boundary between the cells of the eNB 10a and eNB 10b. Therefore, it can be considered that the eNB 10b is one of base stations that causes the strongest interference among the adjacent base stations of the eNB 10a. Thus, reducing the interference from the eNB 10b as described above significantly enhances the probability that the UE 20 properly receives a signal which instructs resetting of the radio resource, from the eNB 10a.

Similarly, for communication between the UE 20 and the eNB 10b during the random access process, it becomes possible to allocate the RPB of the eNB 10a notified of by the eNB 10a. The eNB 10a among the adjacent base stations of the eNB 10b is considered as a base station that causes the strongest interference to the communication between the UE 20 and the eNB 10b. For this reason, reducing the interference from the eNB 10a as described above allows for establishment of appropriate uplink and downlink transmissions.

Thus, the eNB 10a and the eNB 10b can appropriately suppress mutual interference during handover, and can desirably enhance a handover success rate for handover of the UE 20 from the eNB 10a to the eNB 10b.

Furthermore, in the conventional FFR scheme, each base station statically determines an RPB in order to reduce interference with its neighboring base stations. Thus, a frequency band capable of being allocated to a mobile terminal located near a cell edge of the base station is limited. Furthermore, an available frequency band decreases according to the quantity of the neighboring base stations. Therefore, depending on installation conditions of the base station, a throughput at a cell edge may noticeably decrease, and there may be possibility suffered from shortage of a radio resource such as a frequency band or the like. Specifically, when a number of UEs 20 are simultaneously handed over in a moving train or another situation, shortage of a frequency band to be allocated to these UEs 20 may be caused, and there arises a possibility that the handover will not be successfully performed.

By contrast, according to the operations of the radio communication system 1 described above, when handover of the UE 20 is needed, the eNB 10a exercises control in a handover procedure for the UE 20 so as to selectively and temporarily allocate a radio resource such as an RPB with less interference that is notified of by the eNB 10b. Similarly, the eNB 10b exercises control in the handover procedure for the UE 20 so as to selectively and temporarily allocate a radio resource such as an RPB with less interference that is notified of by the eNB 10a. In this way, a handover control efficiently using limited radio resources can be achieved. To make a notification of radio resource information between the eNB 10a and the eNB 10b, the radio resource information is multiplexed with a control signal that is used in a general handover procedure. For this reason, the aforementioned advantageous effect can be achieved without increasing data traffic.

As an alternative of the present embodiment, the eNB 10a and the eNB 10b may use other radio resource information associated with interference with the UE 20, which preferably indicates a radio resource that can reduce such interference, in place of an RPB. For example, in the case where the eNB 10a and the eNB 10b have a function of adaptively transmitting a directional signal wave or a variable directivity function, they may transmit information indicating a radio resource that can reduce interference based on the directivity.

As another alternative of the present embodiment, an effective period may be set to the radio resource information associated with interference to the UE 20, which is transmitted from the eNB 10a and the eNB 10b. According to this alternative, for example, an effective period during which the PRB of the eNB 10a notified of by the eNB 10a is available to the eNB 10b is set. In this case, the effective period may be set, for example, to several tens micro-sec that is a period needed to perform a handover procedure. By setting the effective period as described above, a control of temporarily using a radio resource that can reduce interference from the eNB 10a only during the handover of the UE 20 can be realized in a relatively simple manner. Furthermore, the eNB 10a or eNB 10b may transmit radio resource information such as an RPB with an effective period thereof being added thereto, and the eNB that has received the radio resource information may perform an appropriate process according to the effective period.

According to the operation of the mobile communication system described above, when a second base station communicates with a mobile terminal, the second base station selects a radio resource with less interference on the basis of first resource information received from the notification means of the first base station, and performs communication. Furthermore, by appropriately changing a radio resource that is indicated by the first resource information according to change of the communication environment, a radio resource with less interference, which dynamically changes, is appropriately selected, and the communication is performed using the radio resource.

Further, the second base station which has received the first resource information is able to suppress interference from the first base station in a relatively simple and quick manner by performing communication using the radio resource indicated by the first resource information. This is especially true when a mobile terminal communicating with the second base station is located near a cell boundary between the cells of the first base station and the second base station.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication system including first and second base stations capable of communicating with a mobile terminal and of communicating with each other, wherein:
the first base station includes first notification means configured to notify the second base station of first resource information when the mobile terminal is handed over from the first base station to the second base station, the first resource information indicating radio resource associated with interference from the first base station to communication between the second base station and the mobile terminal; and
the second base station includes first allocation means configured to allocate the radio resource indicated by the first resource information, for communication between the second base station and the mobile station;
wherein
the first resource information indicates at least one of:
a radio resource that is not used for communication between the first base station and the mobile terminal or that is used with relatively less frequency than other radio resources, a frequency band for which a transmission power is set relatively low compared with other frequency bands, among frequency bands used for communication between the first base station and the mobile terminal, and a radio resource for which antenna directivity of the first base station is set relatively low.

2. The radio communication system according to claim 1, wherein the first allocation means allocates the radio resource indicated by the first resource information, for communication that is established between the second base station and the mobile terminal and that is performed for the handover.

3. The radio communication system according to claim 2, wherein the first notification means superimposes the first resource information on a signal for requesting the handover from the first base station to the second base station in order to transmit the first resource information.

4. The radio communication system according to claim 2, wherein:

the second base station further includes second notification means configured to notify the first base station of second resource information, the second resource information indicating a radio resource associated with interference from the second base station to communication between the first base station and the mobile terminal; and the first base station further includes second allocation means configured to allocate the radio resource indicated by the second resource information, for communication between the first base station and the mobile station.

5. The radio communication system according to claim 4, wherein the second resource information includes at least one of:

a radio resource that is not used for communication between the second base station and the mobile terminal, or that is used with relatively less frequency than other radio communication resources, a frequency band for which a transmission power is set relatively low compared with other frequency bands among frequency bands used for communication between the second base station and the mobile terminal, and a radio resource for which antenna directivity of the second base station is set relatively low.

6. The radio communication system according to claim 4, wherein the second notification means superimposes the second resource information on a response signal to the signal for requesting the handover from the second base station to the first base station in order to transmit the second resource information.

7. The radio communication system according to claim 1, wherein an effective period during which the radio resource associated with the interference from the first base station is available is set in the first resource information.

8. The radio communication system according to claim 7, wherein information indicating the effective period is added to the first resource information.

9. A base station capable of communicating with a mobile terminal and another base station, comprising:

notification means configured to notify said another base station of information when the mobile terminal is handed over from the base station to said another base station, the information indicating a radio resource associated with interference from the base station for communication between said another base station and the mobile terminal;

wherein the information indicates at least one of:

a radio resource that is not used for communication between the base station and the mobile terminal or that is used with relatively less frequency than other radio resources, a frequency band for which a transmission power is set relatively low compared with other frequency bands, among frequency bands used for communication between the base station and the mobile terminal, and a radio resource for which antenna directivity of the base station is set relatively low.

10. A mobile terminal that establish communication with a first base station and a second base station which are capable of communicating with each other, the mobile terminal comprising:

reception means configured to receive information from the first base station when the mobile terminal is handed over from the first base station to the second base station, the information indicating a radio resource associated with interference from the first base station to communication between the second base station and the mobile terminal; and communication means configured to communicate with the second base station using the radio resource associated with interference from the first base station;

wherein the information indicates at least one of:

a radio resource that is not used for communication between the first base station and the mobile terminal or that is used with relatively less frequency than other radio resources, a frequency band for which a transmission power is set relatively low compared with other frequency bands, among frequency bands used for communication between the first base station and the mobile terminal, and a radio resource for which antenna directivity of the first base station is set relatively low.

11. A radio communication method for use in a radio communication system including a first base station and a second base station which are capable of communicating with a mobile terminal and of communicating with each other, the method comprising:

notifying, by the first base station, the second base station of information when the mobile terminal is handed over from the first base station to the second base station, the information indicating a radio resource associated with interference from the first base station to communication between the second base station and the mobile terminal; and allocating the radio resource associated with interference from the first base station for communication between the second base station and the mobile terminal;

wherein the information indicates at least one of:

a radio resource that is not used for communication between the first base station and the mobile terminal or that is used with relatively less frequency than other radio resources, a frequency band for which a transmission power is set relatively low compared with other frequency bands, among frequency bands used for communication between the first base station and the mobile terminal, and a radio resource for which antenna directivity of the first base station is set relatively low.

* * * * *